United States Patent
Huh et al.

(10) Patent No.: US 9,146,417 B2
(45) Date of Patent: *Sep. 29, 2015

(54) POLARIZING PLATE

(71) Applicants: Eun Soo Huh, Daejeon (KR); Ki Ok Kwon, Daejeon (KR); Eun Mi Seo, Daejeon (KR); No Ma Kim, Daejeon (KR); In Ho Hwang, Daejeon (KR); Sung Soo Yoon, Daejeon (KR)

(72) Inventors: Eun Soo Huh, Daejeon (KR); Ki Ok Kwon, Daejeon (KR); Eun Mi Seo, Daejeon (KR); No Ma Kim, Daejeon (KR); In Ho Hwang, Daejeon (KR); Sung Soo Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 9 days.

This patent is subject to a terminal disclaimer.

(21) Appl. No.: 14/183,200

(22) Filed: Feb. 18, 2014

(65) Prior Publication Data

US 2014/0160406 A1 Jun. 12, 2014

Related U.S. Application Data

(63) Continuation of application No. PCT/KR2012/006579, filed on Aug. 17, 2012.

(30) Foreign Application Priority Data

Aug. 19, 2011 (KR) .................. 10-2011-0082868
Aug. 19, 2011 (KR) .................. 10-2011-0082875
Aug. 17, 2012 (KR) .................. 10-2012-0089886

(51) Int. Cl.
*C09K 19/00* (2006.01)
*G02F 1/1335* (2006.01)
*G02B 5/30* (2006.01)

(52) U.S. Cl.
CPC ........ *G02F 1/133528* (2013.01); *G02B 5/3033* (2013.01); *G02F 2201/503* (2013.01); *Y10T 428/10* (2015.01); *Y10T 428/1041* (2015.01); *Y10T 428/1059* (2015.01)

(58) Field of Classification Search
CPC .... G02B 27/26; G02B 5/3025; G02B 5/3033; G02B 5/305; G02F 1/133528; G02F 2201/503; Y10T 428/10; Y10T 428/1041; Y10T 428/1059; Y10T 428/1073; Y10T 428/1077; Y10T 428/1082
USPC .......................... 428/1.1, 1.3, 1.31, 1.5, 1.53; 349/96–103; 156/106, 108; 359/483.01
See application file for complete search history.

(56) References Cited

U.S. PATENT DOCUMENTS

2012/0320317 A1* 12/2012 Yoon et al. ............. 349/96
2013/0250196 A1* 9/2013 Seo et al. ............... 349/15

FOREIGN PATENT DOCUMENTS

| JP | 2001-294828 | 10/2001 |
| JP | 2003-147288 | 5/2003 |
| JP | 2003-177241 | 6/2003 |
| JP | 2007-111970 | 5/2007 |
| JP | 2007-304366 | 11/2007 |

(Continued)

*Primary Examiner* — Ruiyun Zhang
(74) *Attorney, Agent, or Firm* — McKenna Long & Aldridge LLP (57) ABSTRACT

Provided are a polarizing plate and a liquid crystal display device. The polarizing plate has lighter weight, a smaller thickness, and excellent physical properties such as durability, water resistance, workability, and light leakage preventing ability. In addition, the polarizing plate prevents curling of the polarizing plate or a polarizer in formation thereof, and has excellent thermal resistance or thermal shock resistance.

24 Claims, 2 Drawing Sheets

(56) References Cited

FOREIGN PATENT DOCUMENTS

| | | |
|---|---|---|
| JP | 2008-129427 | 6/2008 |
| JP | 2010-009027 | 1/2010 |
| KR | 2008-0004021 | 1/2008 |
| KR | 2010-0078564 | 7/2010 |
| WO | WO 2011105875 A2 * | 9/2011 |
| WO | WO2012064143 A2 * | 5/2012 |

* cited by examiner

POLARIZING PLATE

This application is a Continuation Bypass Application of International Patent Application No. PCT/KR2012/006579, filed Aug. 17, 2012, and claims the benefit of Korean Application No. 10-2011-0082868, filed on Aug. 19, 2011, Korean Application No. 10-2011-0082875, filed on Aug. 19, 2011 and Korean Application No. 10-2012-0089886, filed on Aug. 17, 2012, all of which are hereby incorporated herein by reference in their entirety for all purposes as if fully set forth herein.

BACKGROUND

1. Field of the Invention

The present application relates to a polarizing plate and a liquid crystal display device.

2. Discussion of Related Art

A polarizing plate is an optically functional film applied to a device such as a liquid crystal display (LCD) device.

The polarizing plate may include a polarizer, which is a functional sheet capable of extracting light vibrating in only one direction from incident light vibrating in several directions, and protective films usually attached to both surfaces of the polarizer. The polarizing plate may further include a pressure-sensitive adhesive layer formed under the protective film and used to attach a liquid crystal panel to the polarizing plate, and a releasing film formed under the pressure-sensitive adhesive layer. In addition, the polarizing plate may include an additional functional film such as an anti-reflection film or a phase retardation film.

SUMMARY OF THE INVENTION

The present application is directed to a polarizing plate and an LCD device.

In one aspect, an exemplary polarizing plate includes: a polarizer, an active energy beam-curable adhesive layer, and a single-layered pressure-sensitive adhesive layer, which are sequentially disposed. The pressure-sensitive adhesive layer has first and second surfaces, which have different peel strengths with respect to alkali-free glass.

In the specification, "at least two elements sequentially disposed," for example, the term "A and B" sequentially disposed that the elements A and B are disposed in sequence as described above, and another element C may be interposed between A and B, for example, A, C and B may be disposed in order as described above.

In addition, in the specification, when two elements are described as being attached or directly attached to each other, for example, "B is directly attached to A" may mean that no other element may be disposed on at least one main surface of A, and B may be directly attached thereto.

Figure 1:
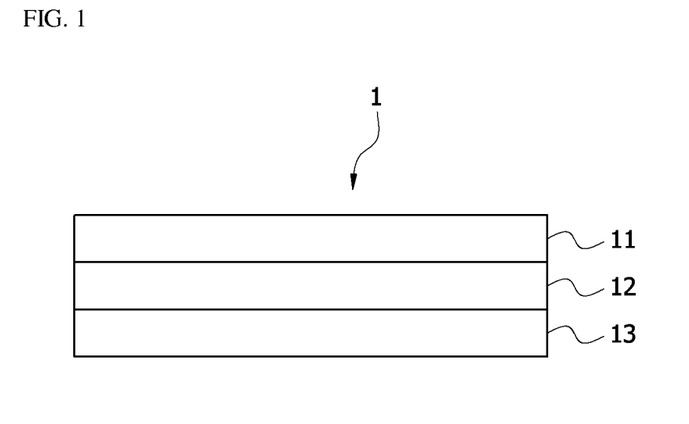
FIG. 1 is a cross-sectional view of a structure of an exemplary polarizing plate.

The exemplary polarizing plate includes a polarizer, an adhesive layer and a pressure-sensitive adhesive layer, which are sequentially disposed. In another example, in the polarizing plate, the adhesive layer may be directly attached to the polarizer, and the pressure-sensitive adhesive layer may also be directly attached to the adhesive layer. FIG. 1 shows a structure 1 of an exemplary polarizing plate, in which a polarizer 11, an adhesive layer 12 and a pressure-sensitive adhesive layer 13 are sequentially disposed.

Since the polarizer is usually manufactured of a hydrophilic resin such as polyvinylalcohol, it is generally vulnerable to moisture. In addition, since an extension process is generally performed in the manufacture of the polarizer, contraction easily occurs under a humid condition, and thus optical characteristics of the polarizing plate are degraded. Accordingly, to reinforce physical properties of the polarizing plate, a protective film represented by a triacetylcellulose (TAC) film is generally attached to both surfaces of the polarizer, and when there is no protective film, due to poor dimensional stability of the polarizer, durability and optical properties are greatly degraded, and water resistance is dramatically decreased.

To this end, in one exemplary structure of the polarizing plate of the present application, since a protective film is not attached to at least one main surface of the polarizer, a thinner and lighter structure and a structure in which an adhesive layer and a pressure-sensitive adhesive layer are directly and continuously attached to the main surface of the polarizer not having the protective film are employed. In addition, as the exemplary polarizing plate of the present application allows both main surfaces of the pressure-sensitive adhesive layer to have different peel strengths, a problem caused by poor dimensional stability of the polarizer may be solved. In the specification, the polarizing plate in which attachment of the protective film is omitted on at least one surface of the polarizer as described above may be referred to as a thin polarizing plate.

As the polarizer, one conventionally used in the art may be used without particular limitation. For example, a polyvinylalcohol-based polarizer may be used as a polarizer. Such a polarizer may be formed by adsorbing and aligning a dichroic pigment on a polyvinylalcohol-based resin film. A polyvinylalcohol-based resin constituting the polarizer, for example, may be obtained by gelating a polyvinylacetate resin. As the polyvinylacetate resin, a homopolymer of vinyl acetate; and a copolymer of vinyl acetate and a different monomer polymerizable with the vinyl acetate may be used. An example of the monomer copolymerizable with vinyl acetate may be unsaturated carbonic acids, olefins, vinyl ethers, unsaturated sulfonic acids or acrylamides having an ammonium group, which are used alone or in combination of at least two thereof. However, the present application is not limited thereto. A degree of gelation for a polyvinyl alcohol resin may be usually about 85 to 100 mol %, for example, 98 mol % or more. The polyvinylalcohol resin may further be modified, and for example, polyvinylformal or polyvinylacetal modified with aldehydes may be used.

An active energy beam-curable adhesive layer is disposed at one side of the polarizer. The adhesive layer may play a critical role in ensuring physical properties of the polarizing plate when the polarizing plate is a thin polarizing plate. For example, the pressure-sensitive adhesive layer has first and second surfaces, and in one example, the first surface may have a higher tensile modulus than the second surface and may be attached to the adhesive layer. In this case, since the first surface has a lower peel strength than the second surface, it may be easily peeled off from the polarizer. However, in the present application, since the adhesive is disposed between the polarizer and the pressure-sensitive adhesive and cured after a single-molecular reactive material of the adhesive is penetrated or diffused into the pressure-sensitive adhesive before the adhesive layer is cured, the adhesive may cause the first surface of the pressure-sensitive adhesive layer to be swollen or may increase roughness of the surface. Thus, cohesion between the pressure-sensitive adhesive layer and the polarizer is ensured, and the polarizing plate can have excellent physical properties. In addition, since the active energy beam-curable adhesive is used instead of a water-based adhesive, curling of the polarizing plate caused by transformation of the polarizer and protective film due to heat generated in a thermal drying and curing operation of the water-based adhesive in an operation of manufacturing the polarizing plate may be prevented, and the polarizer may be effectively protected. As a result, cracks to be generated in the polarizer may be prevented even under a thermal resistant or thermal shock condition.

In the specification, the term "curing of an adhesive composition or pressure-sensitive adhesive composition" refers to an operation of changing an adhesive or pressure-sensitive adhesive composition to express adhesive or pressure-sensitive adhesive characteristics by a physical action or chemical reaction of components of the composition. In addition, in the specification, the term "active energy beam" may refer to microwaves, IR rays, UV rays, X rays, γ rays, or particle beams such as α particle beams, proton beams, neutron beams and electron beams, and conventionally UV rays or electron beams. In addition, the term "active energy beam-curable" used herein may mean that the curing may be induced by radiation with active energy beams. In one example, curing of the adhesive composition may be executed by a free radical polymerization or cationic reaction due to the radiation with active energy beams, for example, by simultaneously or sequentially performing the free radical polymerization and cationic reactions.

The adhesive layer may include a composition including an epoxy compound or an acryl-based monomer in a cured state, for example, a composition including an epoxy compound and an acryl-based monomer in a cured state.

For example, the adhesive composition may include 5 to 80 parts by weight of the epoxy compound and 10 to 200 parts by weight of the acryl-based monomer, for example, 15 to 60 parts by weight of the epoxy compound and 20 to 150 parts by weight of the acryl-based monomer. When the epoxy compound and the acryl-based monomer are included within the content ranges described above, more effective curing of an adhesive composition may be induced, and physical properties may be enhanced by more effectively performing curing due to living characteristics of the cationic reaction which may induce a dark reaction in a state in which the radiation with active energy beams is finished. The unit "parts by weight" used herein refers to a weight ratio between components. An adhesive composition having excellent curing efficiency and physical properties after curing may be provided by controlling the ratio of the components of the adhesive composition.

The term "epoxy compound" used herein may refer to at least one or at least two of monomeric, oligomeric or polymeric compounds including epoxy groups.

The epoxy compound may enhance the physical properties of the adhesive layer such as water resistance and adhesive strength.

For example, as the epoxy compound, the epoxy compound which can be crosslinked or polymerized by a cationic reaction may be used.

In one example, as the epoxy compound, an epoxy resin having a weight average molecular weight (Mw) of 1,000 to 5,000 or 2,000 to 4,000 may be used. In the specification, the weight average molecular weight refers to a conversion value for reference polystyrene measured by gel permeation chromatography (GPC), and unless particularly defined otherwise, the term "molecular weight" refers to the "weight average molecular weight." When the molecular weight of the epoxy resin is 1,000 or more, the durability of the adhesive layer may be suitably maintained, and when the molecular weight of the epoxy resin is 5,000 or less, workability, such as coatability of the composition may be effectively maintained.

In one example, as the epoxy compound, an alicyclic epoxy compound or glycidyl ether-type epoxy compound may be used, for example, a mixture of the alicyclic epoxy compound and the glycidyl ether-type epoxy compound may be used.

The term "alicyclic epoxy compound" used herein may refer to a compound including at least one epoxylated aliphatic ring, and the term "glycidyl ether-type epoxy compound" may refer to a compound including at least one glycidyl ether group.

As the alicyclic epoxy compound is included in the epoxy compound, a glass transition temperature of the adhesive composition is increased, and thus the adhesive layer has sufficient durability. Therefore, even when the protective film is formed on only one surface of the polarizer, occurrence of cracks in the polarizer may be prevented even under a thermal resistant or thermal shock condition.

In the alicyclic epoxy compound including an epoxylated aliphatic ring, for example, the epoxylated aliphatic ring may refer to a compound having an epoxy group formed in an alicyclic ring. Here, a hydrogen atom constituting the alicyclic ring may be optionally substituted with a substituent such as an alkyl group. As the alicyclic epoxy compound, for example, a compound to be specifically exemplified below may be used, but a kind of the epoxy compound capable of being used herein is not limited to the following example.

As the alicyclic epoxy compound, first, an epoxycyclohexylmethyl epoxycyclohexanecarboxylate-based compound represented by Formula 1 may be used:

[Formula 1]

In Formula 1, $R_1$ and $R_2$ are each independently hydrogen or an alkyl group.

The term "alkyl group" used herein, unless specifically defined otherwise, may refer to a linear, branched or cyclic alkyl group having 1 to 20, 1 to 16, 1 to 12, 1 to 8, or 1 to 4 carbon atoms, and the alkyl group may be unsubstituted or optionally substituted with at least one substituent.

As an another example of the alicyclic epoxy compound, an epoxycyclohexane carboxylate-based compound of alkane diol represented by Formula 2 may be used:

[Formula 2]

In Formula 2, $R_3$ and $R_4$ are each independently hydrogen or an alkyl group, and n is an integer between 2 and 20.

In addition, as still another example of the alicyclic epoxy compound, an epoxy cyclohexylmethyl ester-based compound of dicarboxylic acid represented by Formula 3 may be used:

[Formula 3]

In Formula 3, $R_5$ and $R_6$ are each independently hydrogen or an alkyl group, and p is an integer between 2 and 20.

As yet another example of the alicyclic epoxy compound, an epoxycyclohexylmethyl ether-based compound of polyethyleneglycol represented by Formula 4 may be used:

[Formula 4]

In Formula 4, $R_7$ and $R_8$ are each independently hydrogen or an alkyl group, and q represents an integer between 2 and 20.

As yet another example of the alicyclic epoxy compound, an epoxycyclohexylmethyl ether-based compound of alkane diol represented by Formula 5 may be used:

[Formula 5]

In Formula 5, $R_9$ and $R_{10}$ are each independently hydrogen or an alkyl group, and r is an integer between 2 and 20.

As yet another example of the alicyclic epoxy compound, a diepoxytrispiro-based compound represented by Formula 6 may be used:

[Formula 6]

In Formula 6, $R_{11}$ and $R_{12}$ are each independently hydrogen or an alkyl group.

As yet another example of the alicyclic epoxy compound, a diepoxymonospiro-based compound represented by Formula 7 may be used:

[Formula 7]

In Formula 7, $R_{13}$ and $R_{14}$ are each independently hydrogen or an alkyl group.

As yet another example of the alicyclic epoxy compound, a vinylcyclohexene diepoxide compound represented by Formula 8 may be used:

[Formula 8]

In Formula 8, $R_{15}$ represents hydrogen or an alkyl group.

As yet another example of the alicyclic epoxy compound, an epoxycyclopentyl ether compound represented by Formula 9 may be used:

[Formula 9]

In Formula 9, $R_{16}$ and $R_{17}$ are each independently hydrogen or an alkyl group.

As yet another example of the alicyclic epoxy compound, a diepoxy tricyclodecane compound represented by Formula 10 may be used:

[Formula 10]

In Formula 10, $R_{18}$ is hydrogen or an alkyl group.

In more detail, the alicyclic epoxy compound may be, but is not limited to, an epoxycyclohexylmethyl epoxycyclohexane carboxylate compound, an epoxycyclohexane carboxylate compound of alkane diol, an epoxycyclohexylmethyl ester compound of dicarboxylic acid or an epoxycyclohexylmethyl ether compound of alkane diol, for example, at least one selected from the group consisting of an esterification product of 7-oxabicyclo[4,1,0]heptane-3-carboxylic acid and (7-oxa-bicyclo[4,1,0]hepto-3-yl)methanol (a compound of Formula 1 in which $R_1$ and $R_2$ are hydrogen); an esterification product of 4-methyl-7-oxabicyclo[4,1,0]heptane-3-carboxylic acid and (4-methyl-7-oxa-bicyclo[4,1,0]hepto-3-yl) methanol (a compound of Formula 1 in which $R_1$ and $R_2$ are 4-$CH_3$); an esterification product of 7-oxabicyclo[4,1,0]heptane-3-carboxylic acid and 1,2-ethanediol (a compound of Formula 2 in which $R_3$ and $R_4$ are hydrogen, and n is 1); an esterification product of (7-oxabicyclo[4,1,0]hepto-3-yl) methanol and adipic acid (a compound of Formula 3 in which $R_5$ and $R_6$ are hydrogen, and p is 2); an esterification product of (4-methyl-7-oxabicyclo[4,1,0]hepto-3-yl)methanol and adipic acid (a compound of Formula 3 in which $R_5$ and $R_6$ are 4-$CH_3$, and p is 2); and an esterification product of (7-oxabicyclo[4,1,0]hepto-3-yl)methanol and 1,2-ethanediol (a compound of Formula 5 in which $R_9$ and $R_{10}$ are hydrogen, and r is 1).

In addition, as the glycidyl ether-type epoxy compound is included in the epoxy compound, a glycidyl ether functional group may form a soft chain having polarity in the adhesive layer after a curing reaction, and thus adhesive strength of the adhesive layer with respect to a PVA polarizer may be enhanced.

In one example, the glycidyl ether-type epoxy compound may include, for example, aliphatic polyhydric alcohol or alkyleneoxide thereof, for example, polyglycidyl ether of an ethyleneoxide or propyleneoxide addition product.

In one example, when a mixture of an alicyclic epoxy compound and a glycidyl ether-type epoxy compound is used as the epoxy compound, the alicyclic epoxy compound may be 3,4-epoxycyclohexylmethyl, 3,4-epoxycyclohexanecarboxylate, bis(3,4-epoxycyclohexylmethyl)adipatedicyclopentadienedioxide, limonenedioxide or 4-vinylcyclohexenedioxide, and the glycidyl ether-type epoxy compound may be an epoxy compound having an epoxy group other than the alicyclic epoxy group. That is, the glycidyl ether-type epoxy compound may be novolac epoxy, bisphenol A-based epoxy, bisphenol F-based epoxy, brominated bisphenol epoxy, n-butyl glycidylether, aliphatic glycidylether (12 to 14 carbon atoms), 2-ethylhexylglycidyl ether, phenyl glycidyl ether, o-cresyl glycidyl ether, nonyl phenyl glycidyl ether, ethyleneglycol diglycidylether, diethyleneglycol diglycidylether, propyleneglycol diglycidylether, tripropyleneglycol diglycidylether, neopentylglycol diglycidylether, 1,4-butanediol diglycidylether, 1,6-hexanediol diglycidylether, trimethylolpropane triglycidylether, trimethylolpropane diglycidylether, trimethylolpropane polyglycidylether, polyethyleneglycol diglycidylether, or glycerin triglycidylether, And the glycidyl ether-type epoxy compound may be, for example, glycidyl ether having a cyclic aliphatic backbone such as 1,4-cyclohexanedimethanol diglycidyl ether or a hydrogenated compound of an aromatic epoxy compound. In one example, the glycidyl ether-type epoxy compound may be glycidyl ether having a cyclic aliphatic backbone. The glycidyl ether having a cyclic aliphatic backbone may have 3 to 20 carbon atoms, 3 to 16 carbon atoms, or 3 to 12 carbon atoms. However, the present application is not limited thereto.

In this case, the epoxy compound may include 5 to 40 parts by weight of the alicyclic epoxy compound and 5 to 30 parts by weight of the glycidyl ether-type epoxy compound, for example, 15 to 40 parts by weight of the alicyclic epoxy compound and 15 to 30 parts by weight of the glycidyl ether-type epoxy compound, or 20 to 30 parts by weight of the alicyclic epoxy compound and 20 to 30 parts by weight of the glycidyl ether-type epoxy compound. When the alicyclic epoxy compound is included at 5 parts by weight or more, the sufficient durability of the adhesive layer may be ensured, and when the alicyclic epoxy compound is included at 40 parts by weight or less, the adhesive strength to the PVA polarizer is not decreased. When the glycidyl ether-type epoxy compound is included at 5 parts by weight or more, the adhesive strength is increased, and when the glycidyl ether-type epoxy compound is included at 30 parts by weight or less, the durability of the adhesive layer is not decreased.

Here, the alicyclic epoxy compound and the glycidyl ether-type epoxy compound may be included in a weight ratio of 3:1 to 1:3, and within this range, an effect of enhancing the durability of the adhesive layer and the adhesive strength of the adhesive layer with respect to the PVA polarizer may be maximized.

The adhesive composition further includes a radical polymerizable compound. For example, the radical polymerizable compound may be an acryl-based monomer. The term "radical polymerizable compound" used herein may refer to a compound including at least one polymerizable functional group capable of participating in a crosslinking reaction in a molecular structure, for example, a free radical polymerization reaction. The polymerizable functional group may be, but is not limited to, an allyl group, an allyloxy group, an acryloyl group, a methacryloyl group or acrylonitrile.

In one example, the acryl-based monomer may include a hydrophilic acryl-based monomer or a hydrophobic acryl-based monomer. For example, the acryl-based monomer may include a mixture of a hydrophilic acryl-based monomer and a hydrophobic acryl-based monomer.

For example, to enhance the adhesive strength of the adhesive layer to the PVA polarizer, the hydrophilic acryl-based monomer may be included in the acryl-based monomer.

Here, the term "hydrophilic acryl-based monomer" may refer to an acryl-based monomer having hydrophilicity, simultaneously including a polymerizable functional group and a polar functional group in a molecular structure, and the polar functional group may be, but is not limited to, a hydroxyl group, a carboxyl group or an alkoxy group.

For example, the hydrophilic acryl-based monomer may be at least one of the compounds represented by Formulas 11 to 13. For example, the hydrophilic acryl-based monomer may be the compound represented by Formula 11, but the present application is not limited thereto.

[Formula 11]

In Formula 11, $R_{19}$ is hydrogen or an alkyl group, A and B are each independently an alkylene group or an alkylidene group, and n is a number between 0 and 5.

[Formula 12]

In Formula 12, R is hydrogen or an alkyl group, and $R_{20}$ is hydrogen or $-A_3-C(=O)-OH$, in which $A_3$ is an alkylene group or an alkylidene group.

[Formula 13]

In Formula 13, R is hydrogen or an alkyl group, $R_{21}$ is an alkyl group, and $A_1$ and $A_2$ are each independently an alkylene group or an alkylidene group.

The term "alkylene group or alkylidene group" used herein may be a substituted or unsubstituted linear, branched or cyclic alkylene or alkylidene group, which has 1 to 20, 1 to 16, 1 to 12, 1 to 8, or 1 to 4 carbon atoms. For example, the alkylene or alkylidene group may be a linear or branched alkylene or alkylidene group having 1 to 12, 1 to 8 or 1 to 4 carbon atoms.

In Formula 11, n is a number between 0 and 3, for example, between 0 and 2.

In addition, in the compound of Formula 12, $R_{20}$ is hydrogen or $-(CH_2)_m-C(=O)-OH$ (m is an integer between 1 and 4).

In addition, in the compound of Formula 13, $R_{21}$ may be alkyl having 1 to 4 carbon atoms, and $A_1$ and $A_2$ may be each independently alkylene having 1 to 4 carbon atoms.

The compound of Formula 11 may be 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, the compound of Formula 12 may be acrylic acid, methacrylic acid or β-carboxyethyl (meth)acrylate, and the compound of Formula 13 may be 2-(2-ethoxyethoxy)ethyl (meth)acrylate, but the present application is not limited thereto.

In one example, the hydrophilic acryl-based monomer may be the compound represented by Formula 11.

The acryl-based monomer may include 10 to 80 parts by weight of the hydrophilic monomer, or 20 to 60 parts by weight of the hydrophilic monomer. When the hydrophilic monomer is included in the above range, adhesive strength of the pressure-sensitive adhesive layer with respect to the PVA polarizer may be enhanced.

In addition, in one example, the acryl-based monomer may include at least one hydrophobic acryl-based monomer to control attachment strength, compatibility and glass transition temperature.

Here, the hydrophobic acryl-based monomer may be, for example, an acrylic acid ester of an aromatic compound, a methacrylic acid ester of an aromatic compound, an alkyl acrylate or an alkyl methacrylate having a long chain alkyl group, for example, an alkyl group having 9 or more carbon atoms, for example, 9 to 15 carbon atoms, or acrylic acid ester or methacrylic acid ester of alicyclic compound.

In one example, the hydrophobic acryl-based monomer may be a compound represented by Formula 14 and/or a compound represented by Formula 15.

[Formula 14]

In Formula 14, $R_{22}$ is hydrogen or an alkyl group, D is an alkylene group or an alkylidene group, Q is a single bond, an oxygen atom or a sulfur atom, Ar is an aryl group, and p is a number between 0 and 3.

[Formula 15]

In Formula 15, R is hydrogen or an alkyl group, and $R_{23}$ is a monovalent residue derived from an alkyl group having 9 or more carbon atoms, or a monovalent residue derived from an alicyclic compound.

In Formula 14, the term "single bond" means that there is no separate atom in the part represented by Q, and D or a carbon atom of $C(=O)$ is directly connected to Ar.

In addition, in Formula 14, an aryl group refers to a monovalent residue derived from a compound including a structure including benzene or a structure in which at least two benzenes are connected to each other or condensed, or a derivative thereof. The aryl group, for example, may be an aryl group having 6 to 22 carbon atoms, 6 to 16 carbon atoms, or 6 to 13 carbon atoms, and for example, a phenyl group, a phenylethyl group, a phenylpropyl group, a benzyl group, a tollyl group, a xylyl group or a naphthyl group.

In addition, in Formula 14, p is 0 or 1.

In addition, in the compound of Formula 15, $R_{23}$ is a monovalent residue derived from an alicyclic compound having 3 to 20 carbon atoms, for example, 6 to 15 carbon atoms, or $R_{23}$ is an alkyl group having 9 to 15.

The compound of Formula 14 may be, but is not limited to, phenoxy ethyl (meth)acrylate, benzyl (meth)acrylate, 2-phenylthio-1-ethyl (meth)acrylate, 6-(4,6-dibromo-2-isopropyl phenoxy)-1-hexyl (meth)acrylate, 6-(4,6-dibromo-2-sec-butyl phenoxy)-1-hexyl (meth)acrylate, 2,6-dibromo-4-nonylphenyl (meth)acrylate, 2,6-dibromo-4-dodecyl phenyl (meth)acrylate, 2-(1-naphthyloxy)-1-ethyl (meth)acrylate, 2-(2-naphthyloxy)-1-ethyl (meth)acrylate, 6-(1-naphthyloxy)-1-hexyl (meth)acrylate, 6-(2-naphthyloxy)-1-hexyl (meth)acrylate, 8-(1-naphthyloxy)-1-octyl (meth)acrylate or 8-(2-naphthyloxy)-1-octyl (meth)acrylate, conventionally phenoxy ethyl (meth)acrylate, benzyl(meth)acrylate 2-phenylthio-1-ethyl acrylate, 8-(2-naphthyloxy)-1-octyl acrylate or 2-(1-naphthyloxy)-ethyl acrylate. For example, the compound of Formula 14 may be phenoxy ethyl (meth)acrylate or benzyl (meth)acrylate.

The compound of Formula 15 may be, but is not limited to, isobornyl (meth)acrylate, cyclohexyl (meth)acrylate, norbornanyl (meth)acrylate, norbornenyl (meth)acrylate, dicyclopentadienyl (meth)acrylate, ethynylcyclohexane (meth)acrylate, ethynylcyclohexene (meth)acrylate or ethynyldecahydronaphthalene (meth)acrylate. For example, the compound of Formula 15 may be isobornyl (meth)acrylate.

As the acryl-based monomer, the hydrophobic acryl-based monomer may be used, for example, at 60 parts by weight or less, for example, 10 to 60 parts by weight. When the hydrophobic acryl-based monomer is included at less than 10 parts by weight, the number of hydrophilic functional groups is more than that of hydrophobic functional groups, and thus a water resistant characteristic of the polarizing plate may be degraded. When the hydrophobic acryl-based monomer is included at more than 60 parts by weight, the attachment strength to the PVA polarizing element may be degraded.

In addition, for example, when the compound of Formula 14 is used as the hydrophobic compound, the compound may be included, for example, at 0 to 40 parts by weight, or 10 to 30 parts by weight. In addition, when the compound of Formula 15 is used as the hydrophobic compound, the compound may be included, for example, at 0 to 30 parts by weight, or 5 to 20 parts by weight. In such a weight ratio, the attachment strength to a base, for example, an acryl protective film to be described below, may be maximized.

In one example, the adhesive composition may further include a reactive oligomer. The term "reactive oligomer" refers to a compound formed by polymerizing at least two monomers, and includes all compounds having a polymerizable functional group capable of participating in a crosslinking reaction, for example, the kind of polymerizable functional group previously described in the description of the radical polymerizable compound.

The reactive oligomer may be, but is not limited to, a photo-reactive oligomer known in the art, urethane acrylate, polyester acrylate, polyether acrylate or epoxy acrylate. For example, the reactive oligomer may be urethane acrylate.

In the adhesive composition, the reactive oligomer may be included, for example, at 1 to 40 parts by weight, or 5 to 20 parts by weight. In such a weight ratio, a synergistic effect of the glass transition temperature of the adhesive layer may be maximized.

The adhesive composition may further include a cationic initiator as an initiator for starting a curing reaction. As the cationic initiator, any one starting a cationic reaction by application or radiation of light without limitation, for example, a cationic photoinitiator for starting a cationic reaction by radiation with active energy beams, may be used.

In one example, the cationic photoinitiator may be an onium salt- or organometallic salt-based ionic cationic initiator, or a non-ionic cationic photoinitiator such as an organic silane- or latent sulfonic acid-based cationic photoinitiator or other non-ionic compounds. The onium salt-based initiator may be diaryliodonium salt, triarylsulfonium salt or aryldiazonium salt, the organometallic salt-based initiator may be iron arene, the organic silane-based initiator may be o-nitrobenzyl triaryl silyl ether, triaryl silyl peroxide or acyl silane, and the latent sulfonic acid-based initiator may be α-sulfonyloxy ketone or α-hydroxymethylbenzoin sulfonate. However, the present application is not limited thereto. In addition, as the cationic initiator, a mixture of an iodine-based initiator and a photosensitizer may be used.

The cationic initiator is an ionized cationic photoinitiator, for example, an onium salt-based ionized cationic photoinitiator. In one example, the cationic initiator is a triacrylsulfonium salt-based ionized cationic photoinitiator. However, the present application is not limited thereto.

The adhesive composition may include 0.01 to 10 parts by weight, for example, 0.1 to 5 parts by weight of the cationic initiator. In this range, the adhesive composition may have excellent curing efficiency and physical properties after curing.

The adhesive composition may further include a photoinitiator as a radical initiator capable of starting a polymerization or crosslinking reaction of an acryl-based monomer. For example, the photoinitiator may be an initiator such as benzoin-based photoinitiator, a hydroxyketone compound, an aminoketone compound or a phosphine oxide compound. In one example, the photoinitiator may be a phosphine oxide compound. In detail, the photoinitiator may be, but is not limited to, benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-one, 1-hydroxy cyclohexylphenylketone, 2-methyl-1-[4-(methylthio)phenyl]-2-morpholino-propane-1-one, 4-(2-hydroxyethoxy)phenyl-2-(hydroxy-2-propyl)ketone, benzophenone, p-phenylbenzophenone, 4,4'-diethylamino benzophenone, dichloro benzophenone, 2-methylanthraquinone, 2-ethylanthraquinone, 2-t-butylanthraquinone, 2-amino anthraquinone, 2-methyl thioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], bis(2,4,6-trimethylbenzoyl)-phenyl-phosphineoxide or 2,4,6-trimethylbenzoyl-diphenyl-phosphineoxide.

In the adhesive composition, the photoinitiator may be included at 0.1 to 10 parts by weight, for example, 0.5 to 5 parts by weight, and in this range, effective polymerization and crosslinking may be induced, and degradation in physical properties due to reaction residues may be prevented.

The adhesive composition may also use an initiator generating a radical by absorbing active energy beams having a long wavelength, that is, a long-wavelength photoinitiator, as a radical initiator. Such an initiator may be used alone or in combination with a different kind of initiator.

That is, in the protective film included in the polarizing plate, a UV protector may be mixed to protect the polarizer from UV rays. In this case, when electromagnetic waves are radiated to cure the adhesive composition, electromagnetic waves having a short wavelength, for example, a wavelength of approximately 365 nm or less, are absorbed by the protective film, and thus the suitable curing reaction may not progress. To prevent this problem, the radical initiator may include an initiator capable of generating radicals by absorbing electromagnetic waves having a long wavelength, for example, a wavelength of approximately 365 nm or more.

The long-wavelength photoinitiator may be, for example, diphenyl(2,4,6-trimethylbenzoyl)-phosphineoxide, or bis(2,4,6-trimethylbenzoyl)-phenylphosphineoxide. For example, the long wavelength photoinitiator may be Darocur TPO or Irgacure 819 produced by Ciba Specialty Chemicals, Switzerland, but the present application is not limited thereto.

The adhesive composition may further include an additive such as a photosensitizer, an antioxidant or an attachment enhancing agent, or a known oligomer component to control adhesion performance and brittleness when necessary.

In one example, the adhesive composition may be formulated in a non-solvent type. The non-solvent type composition may mean a kind of adhesive composition not including an organic or water-based solvent component used to dilute components constituting the adhesive composition. As the adhesive composition is formulated in a non-solvent type, a volatilization process for a solvent is not necessary in the formation of the adhesive layer, thickness uniformity may be effectively maintained, and curling of the polarizer may be effectively prevented.

The adhesive composition may have a viscosity at 25° C. of 5 to 1,000 cps, for example, 10 to 100 cps. As the viscosity is controlled in this range, process efficiency, ease of controlling a thickness and thickness uniformity may be ensured, and the physical properties such as the adhesive characteristic may be effectively maintained.

A method of forming the adhesive layer on the polarizer using the composition is not particularly limited, and thus, for example, a method of coating an adhesive composition on the polarizer and curing the composition, or coating the adhesive composition on the polarizer, laminating the pressure-sensitive adhesive layer again and curing the coated adhesive composition may be used. In this case, the curing of the adhesive composition may be executed by a method of radiating active energy beams having a suitable intensity to induce a polymerization or crosslinking reaction of the component in consideration of each component.

The adhesive layer may have a thickness of 0.1 to 30 μm, 0.5 to 15 μm, or 1 to 10 μm. As the thickness of the adhesive layer is controlled to 0.1 μm or more, the water resistance of the polarizing plate may be excellently maintained, and when the thickness of the adhesive layer is controlled to 30 μm or less, the thin polarizing plate having a uniform adhesive layer and excellent physical properties may be formed.

The pressure-sensitive adhesive layer included in the polarizing plate has first and second surfaces which have different peel strengths with respect to alkali-free glass. In one example, the second surface has a higher peel strength than the first surface with respect to alkali-free glass, the first surface is directly attached to the adhesive layer, and the second surface may be a pressure-sensitive adhesive surface to attach the polarizing plate to a liquid crystal panel. The "alkali-free glass" used herein refers to glass having a small alkali component, and may contain aluminum oxide instead of the alkali component.

In one example, the pressure-sensitive adhesive layer may be a single-layered pressure-sensitive adhesive layer having first and second surfaces. The single layer refers to the fact that the pressure-sensitive adhesive layer is formed in a single layer, and thus a pressure-sensitive adhesive layer having a structure in which, for example, two or more layers of pressure-sensitive adhesive are formed would not be referred to as a single-layered pressure-sensitive adhesive layer.

Figure 2:
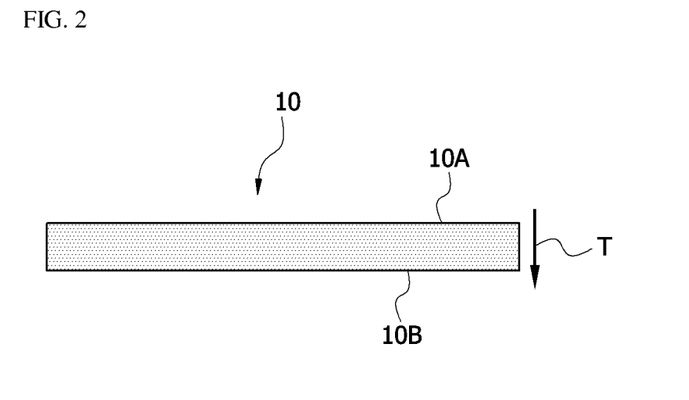
FIG. 2 is a cross-sectional view of an exemplary pressure-sensitive adhesive layer.

FIG. 2 exemplifies a single-layered pressure-sensitive adhesive layer 10 having first and second surfaces 10A and 10B.

As described above, in the pressure-sensitive adhesive layer, since the first surface attached to the polarizer is set to have lower peel strength than the second surface with respect to alkali-free glass, contraction or expansion of the polarizer under a severe condition such as high temperature or high humidity may be effectively inhibited. In addition, as the second surface 10B attaching the polarizing plate to the liquid crystal panel is set to have a higher peel strength than the first surface, the second surface 10B may have excellent wettability with respect to an adherent, and thus adhesion reliability may be enhanced.

In one example, the pressure-sensitive adhesive layer may be controlled such that the difference in peel strength between the first and second surfaces with respect to alkali-free glass may satisfy General Equation 1.

$$X_2 - X_1 > 50 \text{ gf/25 mm} \quad \text{[General Equation 1]}$$

In General Equation 1, $X_1$ is peel strength of the first surface with respect to alkali-free glass, and $X_2$ is peel strength of the second surface with respect to alkali-free glass.

In one example, the first surface may have a peel strength with respect to alkali-free glass of 5 to 100 gf/25 mm, 8 to 70 gf/25 mm, 10 to 60 gf/25 mm, or 15 to 50 gf/25 mm. In addition, the second surface may have a peel strength with respect to alkali-free glass of 100 to 1,000 gf/25 mm, 150 to 800 gf/25 mm, 200 to 700 gf/25 mm, or 250 to 650 gf/25 mm. The peel strength is measured by a method defined in the following Example. As the peel strength of the second surface with respect to alkali-free glass is controlled to be higher than that of the first surface within a range exceeding 50 gf/25 mm and the peel strengths of the first and second surfaces are each controlled to be within the above-mentioned range, the contraction and expansion of the polarizer may be effectively prevented under a high temperature or high humidity condition, and the liquid crystal panel may have excellent wettability.

The pressure-sensitive adhesive layer which is a single layer and has different peel strengths of the first and second surfaces may be manufactured, for example, by forming a gradient formed by changing an elastic modulus according to a thickness direction of the pressure-sensitive adhesive layer. Referring to FIG. 2, in one example, the pressure-sensitive adhesive layer 10 may have a tensile modulus gradient according to a thickness direction (an arrow (T) direction of FIG. 3) from the first surface 10A to the second surface 10B. Here, the change in tensile modulus according to the thickness direction refers to continuous or intermittent increase or reduction of the tensile modulus according to the thickness direction. In detail, the tensile modulus may be changed according to the thickness direction such that the first surface 10A has the highest tensile modulus and the second surface 10B has the lowest tensile modulus.

To make such a change in tensile modulus of the pressure-sensitive adhesive layer according to the thickness direction, for example, a method of controlling a curing degree of the pressure-sensitive adhesive layer to have different values according to a direction may be used. For example, as will be described below, when the pressure-sensitive adhesive layer is constituted using a UV-curable pressure-sensitive adhesive composition, the pressure-sensitive adhesive layer whose storage modulus is changed according to the thickness direction may be manufactured by suitably controlling a thickness of the coated pressure-sensitive adhesive composition and an intensity of UV rays applied in curing of the composition. That is, when the pressure-sensitive adhesive layer is manufactured in the above-mentioned method, the radiated UV rays are transmitted in the thickness direction of the pressure-sensitive adhesive composition, and then become extinct or are absorbed by reaction with an internal photoinitiator. Here, when a degree of the extinction or absorption of the UV rays is suitably controlled, the intensity of the UV rays inducing the curing reaction may be decreased downward according to the thickness direction of the pressure-sensitive adhesive composition, and thus the curing degree may be controlled differently according to the thickness direction. In the present application, in some cases, the pressure-sensitive adhesive layer having a changed curing degree in the thickness direction may also be realized by a method of mixing a suitable amount of a UV absorbent in the photocurable pressure-sensitive adhesive composition. That is, when the UV absorbent mixed in the pressure-sensitive adhesive composition absorbs UV rays applied to the composition in the curing operation, the deviation of a radiation amount of the UV rays may be formed according to the thickness direction, and thus the curing degree may be controlled to be different.

When the tensile modulus is controlled to be changed according to the thickness direction as described above, the pressure-sensitive adhesive layer may have an average tensile modulus at 25° C. of 0.1 to 500 MPa, 10 to 400 MPa, 20 to 300 MPa, or 45 to 200 MPa. As the average tensile modulus is controlled to fall within the above-mentioned range, the polarizer may effectively prevent a light leakage phenomenon and have excellent durability under a high temperature or high humidity condition. Meanwhile, the tensile modulus is measured by the method to be described in the following Example.

A thickness of the pressure-sensitive adhesive layer realized as described above may be, but is not particularly limited to being, controlled to be within a range of 20 to 80 μm, for example, 25 to 60 μm. When the thickness of the pressure-sensitive adhesive layer is less than 20 μm, the efficiency of preventing the contraction or expansion of the polarizer may be degraded, or the efficiency of realizing the pressure-sensitive adhesive layer having different curing degrees in the thickness direction according to the above-described curing process may be degraded. When the thickness of the pressure-sensitive adhesive layer is more than 80 μm, a thin polarizing film may be difficult to form.

A method of forming the pressure-sensitive adhesive layer is not particularly limited. For example, the pressure-sensitive adhesive layer may be formed by curing a conventional room temperature-curable, moisture-curable, heat-curable or photocurable pressure-sensitive adhesive composition. In one example, the pressure-sensitive adhesive layer may be formed by curing a UV-curable pressure-sensitive adhesive composition.

In one example, the pressure-sensitive adhesive layer may include a so called interpenetrating polymer network (hereinafter referred to as "IPN"). The term "IPN" may refer to a state in which at least two kinds of crosslinking structures are present in the pressure-sensitive adhesive layer, and in one example, the crosslinking structure may be present in an entangled, linked or penetrated state. When the pressure-sensitive adhesive layer includes the IPN, a polarizing plate having excellent durability under a severe condition, and excellent workability, optical characteristics and a light leakage preventing ability may be realized.

When the pressure-sensitive adhesive layer includes the IPN structure, the first pressure-sensitive adhesive layer may include, for example, a crosslinking structure including an acryl polymer present in a crosslinked state and a crosslinking structure including a polymerized photo-polymerizable compound.

Here, as the acryl polymer, for example, an acryl polymer having a weight average molecular weight (Mw) of 500,000 or more may be used. When the weight average molecular weight (Mw) of the polymer is 500,000 or more, a pressure-sensitive adhesive layer having excellent durability under a severe condition may be formed. The upper limit of the molecular weight is not particularly limited, and for example, in consideration of the durability of the pressure-sensitive adhesive or coatability of the composition, the molecular weight may be controlled within a range of 2,500,000 or less.

In one example, the acryl polymer may be a polymer including a (meth)acrylic acid ester-based monomer in a polymerization unit.

As the (meth)acrylic acid ester-based monomer, for example, an alkyl (meth)acrylate may be used, and in consideration of cohesive strength, glass transition temperature and pressure-sensitive adhesion, alkyl (meth)acrylate including an alkyl group having 1 to 14 carbon atoms may be used. Such a monomer may be methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate or tetradecyl (meth)acrylate, which may be used alone or in combination of at least two thereof.

The polymer may further include a crosslinkable monomer in a polymerization unit. The polymer is a polymer including 50 to 99.9 parts by weight of the (meth)acrylic acid ester-based monomer and 0.1 to 50 parts by weight of the crosslinkable monomer in a polymerized form. Here, the "crosslinkable monomer" refers to a monomer capable of being copolymerized with the (meth)acrylic acid ester-based monomer, which may provide a crosslinkable functional group to a side chain or terminal end of the polymer after copolymerization.

As the crosslinkable monomer, a monomer which may serve to control the durability, pressure-sensitive adhesive strength and cohesive strength of the pressure-sensitive adhesive, and to provide, for example, a hydroxyl group, a carboxyl group, an epoxy group, an isocyanate group or a nitrogen-containing functional group such as an amino group to the polymer, and may be copolymerizable with the (meth)acrylic acid ester-based monomer. Various monomers serving as described above are known in the art, and herein all of them may be used. In detail, the crosslinkable monomer may be, but is not limited to, a monomer having a hydroxyl group such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethyleneglycol (meth)acrylate or 2-hydroxypropyleneglycol (meth)acrylate, a monomer having a carboxyl group such as (meth)acrylic acid, 2-(meth)acryloyloxy acetic acid, 3-(meth)acryloyloxy propylic acid, 4-(meth)acryloyloxy butyric acid, acrylic acid dimer, itaconic acid, maleic acid or maleic anhydride, a monomer having an epoxy group such as glycidyl (meth)acrylate, or a monomer having nitrogen such as (meth)acrylamide, N-vinyl pyrrolidone or N-vinyl caprolactame, which may be used alone or in combination of at least two thereof.

The acryl polymer may further include a suitable comonomer, other than those described above.

For example, the polymer may further include a monomer represented by Formula 16 as a polymerization unit.

[Formula 16]

In Formula 16, R is hydrogen or an alkyl group, A is an alkylene, $R_{24}$ is an alkyl group or an aryl group, and n is a number between 1 and 50.

The monomer of Formula 16 provides an alkyleneoxide group to the polymer. In one example, the alkyleneoxide group may be a linear, branched or cyclic alkyleneoxide having 1 to 20, 1 to 16, 1 to 12, 1 to 8 or 1 to 4 carbon atoms. The alkyleneoxide group may allow the pressure-sensitive adhesive layer to have a low haze, and to effectively prevent light leakage when the pressure-sensitive adhesive layer is applied to the polarizer. In addition, the alkyleneoxide group may allow the peel strength to be maintained at a suitable level even in a state in which the elastic modulus of the pressure-sensitive adhesive is increased.

In Formula 16, R is hydrogen or an alkyl group having 1 to 4 carbon atoms, for example, hydrogen or a methyl group.

In addition, in Formula 16, A is a substituted or unsubstituted alkylene group having 1 to 20, 1 to 16, 1 to 12, 1 to 8 or 1 to 4 carbon atoms, and such an alkylene group may have a linear, branched or cyclic structure.

In addition, in Formula 16, when $R_{24}$ is an alkyl group, the alkyl group may be a substituted or unsubstituted alkyl group having 1 to 20, 1 to 16, 1 to 12, 1 to 8 or 1 to 4 carbon atoms, and such an alkyl group may have a linear, branched or cyclic structure.

In addition, in Formula 16, when $R_{24}$ is an aryl group, the aryl group may be an aryl group having 6 to 20, 6 to 16 or 6 to 12 carbon atoms.

In addition, in Formula 16, n may be a number between 1 and 25, 1 and 15, or between 1 and 6.

The monomer of Formula 16 may be an alkoxy alkyleneglycol (meth)acrylic acid ester, an alkoxy dialkyleneglycol (meth)acrylic acid ester, an alkoxy trialkyleneglycol (meth)acrylic acid ester, an alkoxy tetraalkyleneglycol (meth)acrylic acid ester, an alkoxy polyethyleneglycol (meth)acrylic acid ester, a phenoxy alkyleneglycol (meth)acrylic acid ester, a phenoxy dialkyleneglycol (meth)acrylic acid ester, a phenoxy trialkyleneglycol (meth)acrylic acid ester, a phenoxy tetraalkyleneglycol (meth)acrylic acid ester or a phenoxy polyalkyleneglycol (meth)acrylic acid ester, which may be used alone or in combination of at least two thereof.

When the acryl polymer includes the monomer of Formula 16, the acryl polymer may include, for example, 40 to 99.9 parts by weight of a (meth)acrylic acid ester monomer, 10 to 50 parts by weight of the monomer of Formula 16, and 0.01 to 30 parts by weight of a crosslinkable monomer. When the components are included in the above-described weight ratio, the light leakage may be effectively prevented, and the peel strength may be maintained at a suitable level in a state in which the elastic modulus of the pressure-sensitive adhesive layer is increased.

The polymer may further include a monomer represented by Formula 17 to control a glass transition temperature and provide other functionalities.

[Formula 17]

In Formula 17, $R_{25}$ and $R_{27}$ are each independently hydrogen or alkyl, $R_{28}$ is cyano group; phenyl group which is unsubstituted or substituted with alky; acetyloxy group; or $COR_{29}$, and here, $R_{29}$ is glycidyloxy group, or amino group which is unsubstituted or substituted with alkyl or alkoxyalkyl.

The monomer of Formula 17 may be, but is not limited to, a nitrogen-containing monomer such as (meth)acrylonitrile, (meth)acrylamide, N-methyl (meth)acrylamide or N-butoxy methyl (meth)acrylamide, a styrene-based monomer such as styrene or methyl styrene, glycidyl (meth)acrylate, or carbonic acid vinyl ester such as vinyl acetate, which may be used alone or in combination of at least two thereof.

When the acryl polymer includes the monomer of Formula 17, the monomer of Formula 17 may be included at 20 parts by weight or less.

The acryl polymer may be prepared by a conventional polymerization method known in the art. For example, as described above, the acryl polymer may be prepared by preparing a monomer mixture by suitably mixing the (meth) acrylic acid ester monomer, the crosslinkable monomer and/or the monomer of Formula 16 in a desired weight ratio, and applying a conventional polymerization method such as solution polymerization, photopolymerization, bulk polymerization, suspension polymerization or emulsion polymerization to the mixture. When necessary in this operation, a suitable polymerization initiator or a chain transfer agent may also be used.

The pressure-sensitive adhesive layer may further include a multifunctional crosslinking agent crosslinking the acryl polymer, and as the crosslinking agent, for example, a general crosslinking agent such as an isocyanate crosslinking agent, an epoxy crosslinking agent, an aziridin crosslinking agent, or a metal chelate crosslinking agent may be used. Preferably, an isocyanate crosslinking agent is used, but the present application is not limited thereto. As the isocyanate crosslinking agent, a multifunctional isocyanate compound such as tolylene diisocyanate, xylene diisocyanate, diphenylmethane diisocyanate, hexamethylene diisocyanate, isophorone diisocyanate, tetramethylxylene diisocyanate or naphthalene diisocyanate, or a compound prepared by reacting the multifunctional isocyanate compound with a polyol compound such as trimethylol propane may be used. As the epoxy crosslinking agent, at least one selected from the group consisting of ethyleneglycol diglycidylether, triglycidylether, trimethylolpropane triglycidylether, N,N,N',N'-tetraglycidyl ethylenediamine and glycerin diglycidylether may be used, and as the aziridine crosslinking agent, at least one selected from the group consisting of N,N'-toluene-2,4-bis(1-aziridine carboxamide), N,N'-diphenylmethane-4,4'-bis(1-aziridine carboxamide), triethylenemelamine, bisisoprothaloyl-1-(2-methylaziridine) and tri-1-aziridinylphosphine oxide may be used, but the present application is not limited thereto. In addition, as the metal chelate crosslinking agent, a compound in which a polyvalent metal such as aluminum, iron, zinc, tin, titanium, antimony, magnesium and/or vanadium is (are) coordinated to acetyl acetone or ethyl acetoacetate may be used, but the present application is not limited thereto.

The multifunctional crosslinking agent may be included in the pressure-sensitive adhesive, for example, at 0.01 to 10 parts by weight, or 0.01 to 5 parts by weight based on 100 parts by weight of the acryl polymer described above. In this range, the pressure-sensitive adhesive may maintain excellent cohesive strength and durability.

The multifunctional crosslinking agent may crosslink the polymer by reaction with a crosslinkable functional group of the acryl polymer in the formation of the pressure-sensitive adhesive layer such as an aging process.

In the pressure-sensitive adhesive layer having the IPN structure, a crosslinking structure realized by polymerized multifunctional acrylate may be included together with a crosslinking structure realized by an acryl polymer crosslinked by the multifunctional crosslinking agent.

That is, the pressure-sensitive adhesive composition may further include a photocurable compound as a component to realize a different kind of crosslinking structure from the crosslinking structure realized by crosslinking the acryl polymer. The term "photocurable compound" refers to a compound including at least two photocurable functional groups in a molecular structure, which is polymerized by radiation of light to realize a crosslinking structure. In addition, the photocurable functional group is a functional group capable of being polymerized or crosslinked by the radiation of light, and may be, but is not limited to, a functional group including an ethylene-like unsaturated double bond such as an acryloyl group or a methacryloyl group. In addition, the term "radiation of light" refers to radiation of electromagnetic waves, which may include microwaves, IR rays, UV rays, X rays, γ rays, or particle beams such as α particle beams, proton beams, neutron beams and electron beams.

As the photocurable compound, for example, a multifunctional acrylate (MFA) may be used.

As the multifunctional acrylate, a compound having at least two (meth)acryloyl groups in a molecule may be used without limitation. For example, the multifunctional acrylate may be a bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylated cyclohexyl di(meth)acrylate, tricyclodecanedimethanol (meth)acrylate, dimethylol dicyclopentane di(meth)acrylate, ethyleneoxide-modified hexahydrophthalic acid di(meth) acrylate, tricyclodecane dimethanol(meth)acrylate, neopentylglycol-modified trimethylpropane di(meth)acrylate, adamantane di(meth)acrylate, or 9,9-bis[4-(2-acryloyloxyethoxy)phenyl]fluorine; a trifunctional acrylate such as trimethylolpropane tri(meth)acrylate, dipentaerythritol tri(meth)acrylate, propionic acid-modified dipentaerythritol tri(meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; a tetrafunctional acrylate such as diglycerin tetra(meth)acrylate or pentaerythritol tetra(meth)acrylate; a pentafunctional acrylate such as propionic acid-modified dipentaerythritol penta(meth)acrylate; or a hexafunctional acrylate such as dipentaerythritol hexa(meth) acrylate, caprolactone-modified dipentaerythritol hexa (meth)acrylate, or urethane (meth)acrylate (e.g. a reaction product of an isocyanate monomer and trimethylolpropane tri(meth)acrylate). In some cases, the multifunctional acrylate may be a photocurable oligomer known in the art, which may be any kind of urethane acrylate, polycarbonate acrylate, polyester acrylate, polyether acrylate or epoxy acrylate.

The multifunctional acrylate may be used alone or in combination of at least two thereof. The acrylate having a molecular weight of less than 1,000 and tri- or more functional acrylate may be used in an aspect of realizing the durability, but the present application is not limited thereto.

The multifunctional acrylate may include a ring structure in a backbone structure. As such acrylate is used, the contraction or expansion of the polarizer may be more effectively prevented, and the light leakage prevention effect may be enhanced. The ring structure included in the multifunctional acrylate may be a carbocyclic or heterocyclic structure, or a monocyclic or polycyclic structure. The multifunctional acrylate may be, but is not limited to, a monomer having an isocyanurate structure such as tris(meth)acryloxy ethyl isocyanuarate or hexafunctional acrylate such as isocyanate-modified urethane (meth)acrylate (e.g., a reaction product of an isocyanate monomer and trimethylolpropane tri(meth) acrylate).

The multifunctional acrylate may be included in the pressure-sensitive adhesive layer or the pressure-sensitive adhesive composition at 20 to 200 parts by weight based on 100 parts by weight of the acryl polymer, and thus may more effectively control the tensile modulus of the pressure-sensitive adhesive layer and maintain excellent durability.

The pressure-sensitive adhesive layer may further include a UV absorbent, which may enhance the efficiency of forming a single-layered pressure-sensitive adhesive having different peel strengths of the first and second surfaces described above. That is, to cure the pressure-sensitive adhesive composition for forming the pressure-sensitive adhesive layer, the radiation of light, for example, the radiation of UV rays, is necessarily executed. For example, to form a sheet-shaped pressure-sensitive adhesive, when the pressure-sensitive adhesive composition is coated to a predetermined thickness, and UV rays are radiated to one side of the coating layer, the surface of the coating layer to which the UV rays are radiated may be sufficiently cured and thus have a higher elastic modulus. However, as the radiation of the UV rays is performed downward to the coating layer according to the thickness direction, the UV rays are absorbed into the coating layer by the UV absorbent present on the coating layer. As the radiation is performed from the surface of the coating layer to which the UV rays are radiated to the lower part of the coating layer according to the thickness direction, the amount of the UV rays reaching the coating layer is decreased, and thus the amount of the UV rays reaching the lowest part of the coating layer is the smallest and the curing degree is also the lowest. As a result, the sheet-shaped coating layer has an elastic modulus gradient formed by changing the elastic modulus according to the thickness direction. Here, the elastic modulus refers to a tensile modulus or storage modulus. When the elastic modulus is changed according to the thickness direction in the sheet-shaped pressure-sensitive adhesive layer, a side having a high elastic modulus, that is, the surface of the coating layer to which the UV rays are radiated in curing, may have low peel strength, but the opposite surface of the coating layer may have high peel strength.

Any UV absorbent not inhibiting optical properties, an elastic modulus, repeelability, workability or peel strength of the pressure-sensitive adhesive layer may be used without particular limitation.

The UV absorbent may be, but is not limited to, a benzotriazole compound such as a 2-(2'-hydroxyphenyl)-benzotriazole-based compound such as 2-(2'-hydroxy-5'-methylphenyl)benzotriazole, 2-(3',5'-di-tert-butyl-2'-hydroxyphenyl) benzotriazole, 2-(5'-tert-butyl-2'-hydroxyphenyl) benzotriazole, 2-(2-hydroxy-5-(1,1,3,3,tetramethylbutyl) phenyl)benzotriazole, 2-(3',5'-di-tert-butyl-2'-hydroxyphenyl)-5-benzotriazole, 2-(3'-tert-butyl-2'-hydroxyphenyl-5'-methylphenyl)-5-benzotriazole, 2-(3'-sec-butyl-5'-tert-butyl-2'-hydroxyphenyl)benzotriazole, 2-(2'-hydroxy-4'-octyloxyphenylphenyl)-5-benzotriazole or 2-(3', 5'-di-tert-butyl-2'-hydroxyphenyl)benzotriazole, a benzophenone compound such as a 2-hydroxy benzophenone-based compound having a 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy functional group, a benzoic acid ester compound such as a compound having a substituted benzoic acid ester structure such as 4-tert-butylphenyl salicylate, phenyl salicylate, octylphenyl salicylate, dibenzoyl resorcinol, bis(4-tert-butyl-benzoyl)resorcinol, benzoyl resorcinol, 2,4-di-tert-butylphenyl-3,5'-di-tert-butyl-4-hydroxybenzoate, hexadecyl 3,5-di-tert-butyl-4-4-hydroxybenzoate, octadecyl 3,5-di-tert-butyl-4-hydroxybenzoate or 2-methyl-4,6-di-tert-butylphenyl 3,5-di-tert-butyl-4-hydroxybenzoate, or a triazine compound.

In the pressure-sensitive adhesive composition, the UV absorbent may be included at 10 parts by weight or less based on 100 parts by weight of the acryl polymer, or at 0.1 to 5 parts by weight based on 100 parts by weight of the photopolymerizable compound, but the present application is not limited thereto. The content of the UV absorbent may be changed in consideration of curing conditions of the pressure-sensitive adhesive composition, or a desired elastic modulus or a peel strength characteristic. Meanwhile, when the content of the UV absorbent is excessively increased, a UV absorption amount of a coating solution is excessively increased, and thus it may be difficult to realize the pressure-sensitive adhesive layer in which the elastic modulus varies according to the thickness direction.

The pressure-sensitive adhesive composition may further include a radical initiator capable of effectively inducing the polymerization reaction of the photocurable compound. In one example, the radical initiator may be a photoinitiator, and a particular kind of the photoinitiator may be suitably selected in consideration of a curing rate and yellowing probability. For example, the photoinitiator may be a benzoin-, hydroxyl ketone-, amino ketone- or phosphine oxide-based photoinitiator, which may be used alone or in combination of at least two thereof.

The pressure-sensitive adhesive composition may include the photoinitiator at 0.2 to 20 parts by weight, 0.5 to 10 parts by weight, or 1 to 5 parts by weight based on 100 parts by weight of the acryl polymer. The photoinitiator may be included at 0.2 to 20 parts by weight based on 100 parts by weight of the multifunctional acrylate. According to such control, the reaction of the multifunctional acrylate may be effectively induced, and the degradation of the physical properties of the pressure-sensitive adhesive due to remaining components after curing may be prevented.

The pressure-sensitive adhesive layer may further include a silane coupling agent. The silane coupling agent serves to enhance the cohesion and adhesion stability of the pressure-sensitive adhesive, improve thermal resistance and humidity resistance, and enhance adhesion reliability even when the pressure-sensitive adhesive is left for a long time under a severe condition. For example, the silane coupling agent may be, γ-glycidoxypropyl triethoxy silane, γ-glycidoxypropyl trimethoxy silane, γ-glycidoxypropyl methyldiethoxy silane, γ-glycidoxypropyl triethoxy silane, 3-mercaptopropyl trimethoxy silane, vinyltrimethoxysilane, vinyltriethoxy silane, γ-methacryloxypropyl trimethoxy silane, γ-methacryloxy propyl triethoxy silane, γ-aminopropyl trimethoxy silane, γ-aminopropyl triethoxy silane, 3-isocyanatopropyl triethoxy silane, γ-acetoacetatepropyl trimethoxysilane, acetoacetatepropyl triethoxy silane, β-cyanoacetyl trimethoxy silane, β-cyanoacetyl triethoxy silane, or acetoxyacetotrimethoxy silane, which may be used alone or in combination of at least two thereof. In the present application, a silane-based coupling agent having an acetoacetate or β-cyanoacetyl group is may be used, but the present application is not limited thereto. In the pressure-sensitive adhesive layer, the silane coupling agent may be included at 0.01 to 5 parts by weight, or 0.05 to 1 part by weight based on 100 parts by weight of the acryl polymer, and thus the pressure-sensitive adhesive strength and durability may be effectively maintained.

The pressure-sensitive adhesive layer may further include a tackifier resin. The tackifier resin may be a hydrocarbon-based resin or a hydrogenated product thereof, a rosin resin or a hydrogenated product thereof, a rosin ester resin or a hydrogenated product thereof, a terphene resin or a hydrogenated product thereof, a terphene phenol resin or a hydrogenated product thereof, a polymerized rosin resin and a polymerized rosin ester resin, which may be used alone or in combination of at least two thereof. The tackifier resin may be included at 1 to 100 parts by weight based on 100 parts by weight of the acryl polymer.

The pressure-sensitive adhesive layer may further include at least one additive selected from the group consisting of an epoxy resin, a curing agent, a UV stabilizer, an antioxidant, a coloring agent, a reinforcing agent, a filler, a foaming agent, a surfactant and a plasticizer as long as it does not affect the desired effect.

A method of forming the pressure-sensitive adhesive layer containing the above-described components and having different peel strengths of the first and second surfaces is not particularly limited. For example, the pressure-sensitive adhesive layer may be formed by a method including coating a pressure-sensitive adhesive composition containing the above-described components in a sheet shape, and forming a pressure-sensitive adhesive layer by curing the coating layer by radiating UV rays to one surface of the sheet. Here, as the UV rays are radiated according to the thickness direction of the coating layer to be absorbed into the coating layer, the tensile modulus gradient is formed according to the thickness direction of the cured pressure-sensitive adhesive layer.

That is, the pressure-sensitive adhesive layer may be formed by a method of coating the pressure-sensitive adhesive composition or the coating solution prepared using the same on a suitable process base by conventional means of a bar coater or comma coater and curing the coated material.

In this case, the radiated UV rays may be absorbed during the radiation performed in the thickness direction of the coating layer by controlling a coating thickness of the pressure-sensitive adhesive composition or a degree of radiating the UV rays, or adding the UV absorbent to the composition when necessary, thereby forming the elastic modulus gradient.

Figure 3:
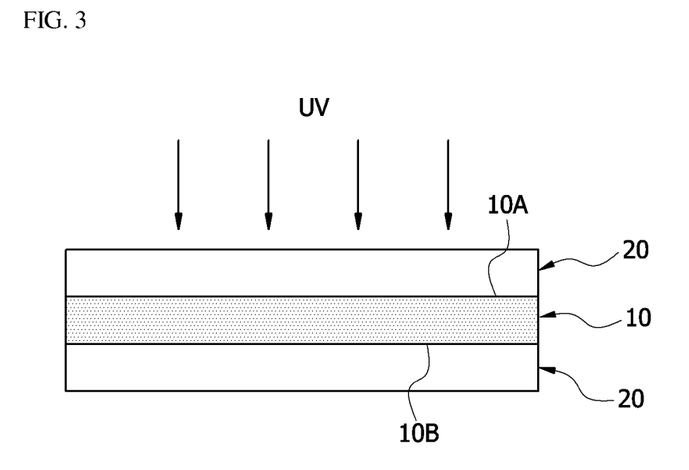
FIG. 3 is a diagram illustrating an exemplary operation of forming a pressure-sensitive adhesive layer.

FIG. 3 is a schematic diagram illustrating an operation of preparing an exemplary pressure-sensitive adhesive, and as shown in FIG. 3, the pressure-sensitive adhesive may be prepared by radiating UV rays to a coating layer 10 of the pressure-sensitive adhesive composition. Here, the radiation of the UV rays may be executed on one surface of the coating layer 10 after the coating layer 10 of the pressure-sensitive adhesive composition is formed between two of releasing films 20. The radiated UV rays are absorbed at a certain ratio while the radiation is performed in a thickness direction of the coating layer 10. Accordingly, while the surface 10A to which the UV rays are directly radiated is sufficiently cured and thus has a high elastic modulus and low peel strength, the opposite surface 10B thereof is relatively less cured and thus has a low elastic modulus and high peel strength.

A desired pressure-sensitive adhesive may be effectively realized using the pressure-sensitive adhesive composition of the present application, by controlling the kind or content of the UV absorbent which may be included in the composition, a thickness of the coating layer 10 (in FIG. 3), or a wavelength or intensity of the UV rays radiated according to the necessity.

Meanwhile, the radiation of UV rays may be executed using a known means such as a high pressure mercury lamp, an electrodeless lamp or a xenon lamp. In addition, conditions for radiating UV rays may be suitably selected in consideration of the composition of the pressure-sensitive adhesive composition without particular limitation, and thus a cured product in which a tensile modulus varies in a thickness direction may be effectively formed. In this case, a luminance may be approximately 50 to 2,000 mW/cm$^2$, and an intensity of radiation may be approximately 10 to 1,000 mJ/cm$^2$. However, the present application is not limited thereto.

In addition, in the formation method of the present application, for the curing efficiency of the pressure-sensitive adhesive composition or the formation of the IPN structure, a process such as heating, drying or aging may be additionally executed in the UV radiation process.

Such a pressure-sensitive adhesive may have a gel content expressed by General Equation 2 of 80 wt % or more, and 90 wt % or more in a state of realizing the IPN structure.

$$\text{Gel Content(wt \%)} = B/A \times 100 \qquad \text{[General Equation 2]}$$

In General Equation 2, A is a mass of the pressure-sensitive adhesive in which the IPN structure is realized, and B is a dry mass of an undissolved content of the pressure-sensitive adhesive yielded after the pressure-sensitive adhesive is precipitated in ethyl acetate at room temperature for 48 hours.

When the gel content is less than 80 wt %, the durability of the pressure-sensitive adhesive may be reduced under a high temperature and/or high humidity condition. The upper limit of the gel content is not particularly limited, but may be suitably controlled within a range of 99% or less, in consideration of a stress relaxation characteristic of the pressure-sensitive adhesive.

The polarizing plate may further include a protective film attached to one surface, specifically, a surface of the polarizer opposite to the surface to which the pressure-sensitive adhesive layer is attached. As the protective film, a cellulose-based film such as a TAC film, a polyester-based film such as a poly(ethylene terephthalate) (PET) film, a polycarbonate-based film, a polyestersulfone-based film, or a polyolefin-based film such as an acryl-based and/or a polyethylene film, a polypropylene film, a cyclic polyolefin film or polyolefin film having a norbornene structure or an ethylene-propylene copolymer film may be used, but the present application is not limited thereto. The protective film may be attached to the polarizer by means of, for example, the adhesive layer described above.

The polarizing plate may further include a releasing film attached under the pressure-sensitive adhesive layer. As the releasing film, a conventional component known in the art may be employed.

The polarizing plate may further include at least one functional layer selected from the group consisting of an anti-reflection layer, an anti-glare layer, a phase retardation plate, a wide viewing angle compensation film and a brightness enhancement film when necessary.

The exemplary LCD device of the present application may include a liquid crystal panel and the polarizing plate attached to one or both surfaces of the liquid crystal panel.

The kind of the liquid crystal panel included in the LCD device is not particularly limited. For example, a known panel such as a passive matrix-type panel such as a twisted nematic (TN), super twisted nematic (STN), ferroelectric (F) or polymer dispersed (PD) panel, an active matrix-type panel such as a two or three terminal panel, an in-plane switching (IPS) panel or a vertically-aligned (VA) panel may be used without limitation.

In addition, kinds of other components constituting the LCD device, for example, upper and lower substrates (e.g., a color filter substrate or an array substrate), are not particularly limited either, and any components known in the art may be employed without limitation.

Advantageous Effect

An exemplary polarizing plate has lighter weight, a smaller thickness, and excellent physical properties such as durability, water resistance, workability, and light leakage preventing ability. In addition, one exemplary polarizing plate does not induce curling occurring in the polarizing plate or a polarizer in formation thereof, and has excellent thermal resistance or thermal shock resistance.

DETAILED DESCRIPTION OF EXEMPLARY EMBODIMENTS

Hereinafter, the present application will be described with reference to

Examples according to the present application and Comparative Examples not according to the present application in detail. However, the scope of the present application is not limited to the following Examples.

PREPARATION EXAMPLE 1

Preparation of Acryl Polymer 98 parts by weight of n-butyl acrylate (n-BA) and 2 parts by weight of 2-hydroxyethyl acrylate (2-HEA) were put into a 1 L reactor refluxing nitrogen gas and equipped with a cooling device to facilitate temperature control. Subsequently, 180 parts by weight of ethyl acetate (EAc) was put into the reactor as a solvent, which was purged with the nitrogen gas for 60 minutes to remove oxygen. Afterwards, the temperature was maintained at 67° C., 0.05 parts by weight of azobisisobutyronitrile (AIBN) was put into the reactor as a reaction initiator, and the reaction was carried out for 8 hours. After the reaction, the reaction product was diluted with ethyl acetate, and thus an acryl polymer having a solid content of 30 wt %, a weight average molecular weight of 1,000,000, and a distribution of molecular weight of 4.9 was prepared.

PREPARATION EXAMPLE 2

Preparation of Adhesive Composition

As an acryl-based monomer, a mixture prepared by mixing 30 parts by weight of hydroxylethyl acrylate (2-HEA), 15 parts by weight of phenoxy ethyl acrylate and 9 parts by weight of isobornyl acrylate was mixed with epoxy compounds including 20 parts by weight of an alicyclic epoxy compound (7-oxabicyclo[4,1,0]heptane-3-ylmethyl 7-oxabicyclo[4,1,0]heptane-3-carboxylate, Celloxide 2021P, Daicel, Inc) and 20 parts by weight of a glycidyl ether-type epoxy compound (1,4-cyclohexane dimethanol diglycidyl ether (CHDMDG)). Subsequently, an adhesive composition having a viscosity at 25° C. of approximately 10 cP was prepared by mixing 3 parts by weight of a radical polymerization initiator (CGI 819, (2,6-dimethoxybenzoyl)-(2,4,4-trimethylpentyl)phosphoryl]-(2,6-dimethoxyphenyl)methanone) and 3 parts by weight of a cationic initiator (1HT-PI 45, 50 wt % mixed triarylsulfonium hexafluorophosphate salt 50 wt % propylene carbonate) with the mixture.

EXAMPLE 1

Preparation of Pressure-Sensitive Adhesive Layer

A pressure-sensitive adhesive composition was prepared by mixing 100 parts by weight of the acryl polymer, 3 parts by weight of a multifunctional crosslinking agent (TDI-based isocyanate, Coronate L, Nippon Polyurethane Industry (Japan)), 100 parts by weight of a multifunctional acrylate (trifunctional urethane acrylate, Aronix M-315, To a Gosei K.K.), 3 parts by weight of a photoinitiator (Irgacure 184, hydroxycyclohexylphenylketone, Ciba Specialty Chemicals (Switzerland)), 3 parts by weight of a triazine-based UV absorbent (Tinuvin 400, Ciba Specialty Chemicals (Switzerland)) and 0.1 parts by weight of a silane coupling agent having a β-cyanoacetyl group (M812, LG Chem (Korea)) in a solvent to have a solid concentration of 30 wt %. Subsequently, the prepared pressure-sensitive adhesive composition was coated on a releasing-treated surface of a poly(ethylene terephthalate) (PET) film (thickness: 38 μm, MRF-38, Mitsubishi) subjected to releasing treatment to have a predetermined dry thickness, and the resulting film was dried in an oven at 110° C. for 3 minutes. Then, a releasing-treated surface of the PET releasing film (thickness: 38 μm, MRF-38, Mitsubishi) subjected to releasing treatment was further laminated on the dried coating layer, thereby forming a stacked structure having a structure of FIG. 3, and UV rays were radiated using a high pressure mercury lamp, thereby forming a pressure-sensitive adhesive layer 10 between two of the PET films 20. Hereinafter, for the convenience of description, a surface of the pressure-sensitive adhesive layer 10 to which the UV rays were radiated is called a first surface 10A, and the opposite surface is called a second surface 10B.

<Conditions for UV Radiation>
Luminance: 250 mW/cm$^2$
Intensity of Radiation: 300 mJ/cm$^2$
Preparation of Polarizing Plate An acryl film (which was formed by extruding and extending a mixture including phenoxy resin, polystyrene and polymethylmethacrylate) was laminated as a protective film on one surface of a polarizer formed by extending a polyvinylalcohol-based resin film, dying the film with iodine and treating the film with a boric acid aqueous solution using the previously prepared adhesive composition. Subsequently, a polarizing plate was formed by laminating the previously formed pressure-sensitive adhesive layer on a surface of the polyvinylalcohol-based polarizer to which the protective film was not attached using the prepared adhesive composition. In detail, a polarizing plate was formed by coating the adhesive composition on the polarizer to have a thickness after curing of approximately 5 μm, laminating the first surface 10A of the pressure-sensitive adhesive layer on the coated surface, and curing the pressure-sensitive adhesive layer by radiation of UV rays under the following conditions.

<Conditions for UV Radiation>
UV Radiation Tool: High Pressure Mercury Lamp
Radiation Conditions:
Luminance: 800 mW/cm$^2$
Intensity of Radiation: 2000 mJ/cm$^2$

EXAMPLES 2 TO 4 AND COMPARATIVE EXAMPLES 1 TO 4

A polarizing plate was formed as described in Example 1, except that the composition of the pressure-sensitive adhesive composition was changed as shown in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Acryl-based Copolymer | 100 | 100 | 100 | 100 | 100 | 100 | 100 | 100 |
| Crosslinking Agent | 3 | 3 | 3 | 3 | 3 | 3 | 3 | 3 |
| MFA | 100 | 120 | 150 | 120 | 120 | 120 | 120 | — |
| Photoinitiator | 3 | 3 | 3 | 3 | 3 | 3 | 3 | — |
| UV Absorbent | 3 | 2 | 3 | 3 | 0.1 | 10 | 3 | — |
| Silane Coupling Agent | 0.1 | 0.1 | 0.1 | 0.1 | 0.1 | 0.1 | 0.1 | 0.1 |
| Thickness (μm) | 40 | 40 | 40 | 60 | 40 | 40 | 15 | 40 |

Content Unit: Parts by Weight
MFA: Trifunctional urethane acrylate (Aronix M-315, Toa Gosei K.K)
Crosslinking Agent: TDI-based isocyanate Crosslinking Agent (Coronate L, Nippon Polyurethane Industry)
Photoinitiator: Irgacure 184: Hydroxy cyclohexylphenyl ketone (Ciba Specialty Chemicals, Switzerland)
UV Absorbent: Triazine-based UV Absorbent (Tinuvin 400, Ciba Specialty Chemicals, Switzerland)
Silane Coupling Agent: M812: Silane Coupling Agent having β-cyanoacetyl group (LG Chem, Korea)

COMPARATIVE EXAMPLE 5

A polarizing plate was formed based on the same method as described in Example 1, except that a TAC film having a thickness of 60 μm was used as a protective film instead of the acryl film, a water-based polyvinylalcohol-based adhesive composition generally used to attach a protective film, as an adhesive attaching the TAC film to the polarizer, was coated to have a dry thickness of 0.1 μm, the water-based polyvinylalcohol-based adhesive composition was coated, the protective film was laminated and dried in an oven at 80° C. for 5 minutes, and the pressure-sensitive adhesive layer was laminated using the water-based polyvinylalcohol-based adhesive composition.

<Evaluation of Physical Properties>
1. Evaluation of Tensile Modulus

Herein, a tensile modulus of a pressure-sensitive adhesive layer was measured by a stress-strain test due to tension according to a method defined in ASTM D638, or when it was difficult to directly measure a tensile modulus, a storage modulus was measured and then converted into the tensile modulus by the following Conversion Formula. In detail, a stacked structure having a structure of FIG. 3 (a stacked structure of a released PET film, a pressure-sensitive adhesive layer and a released PET film) was cut into a dog bone-type specimen in a size of 7 cm (length)×1 cm (width), both ends of the specimen were fixed with jigs for a tensile test, and a tensile modulus was measured. The conditions for measuring the tensile modulus were as follows.

<Conditions for Measuring Tensile Modulus>
Measuring Apparatus: Universal Testing Machine (UTM)
Equipment Model: Zwick Roell Z010, Instron
Measurement Conditions:
Load Cell: 500 N
Tensile Rate: 3 mm/sec
<Measurement of Storage Modulus and Conversion into Tensile Modulus>

A pressure-sensitive adhesive layer was cut in a size of 15 cm×25 cm×25 μm (width×length×thickness), and then the cut pressure-sensitive adhesive layers were stacked in five layers. Subsequently, after the stacked adhesive layers were cut into circles having diameters of 8 mm, the cut stacked adhesive layers are left overnight while they are pressed using glasses to enhance wettability at an interface between the layers, thereby removing air bubbles generated during stacking. As a result, a specimen was prepared. Subsequently, the specimen was placed on a parallel plate, and a gap was adjusted. Then, after Normal & Torque was set to zero, and the stabilization of normal force was checked, the storage modulus was measured under the following conditions, and a tensile modulus was calculated according to the following Conversion Formula.

Measurement Apparatus and Measuring Conditions

Measurement Apparatus: ARES-RDA, TA Instruments Inc. with forced convection oven Measuring Conditions:
Geometry: 8 mm parallel plate
Gap: around 1 mm
Test Type: dynamic strain frequency sweep
Strain=10.0 [%], temperature: 30° C.
Initial Frequency: 0.4 rad/s, final frequency: 100 rad/s $$E=3G \qquad \text{<Conversion Formula>}$$

In the Conversion Formula, E is a tensile modulus, and G is a storage modulus.

2. Evaluation of Peel Strength and Repeelability

A polarizing plate was formed by the method as described in Example 1 using the pressure-sensitive adhesive layer formed in Example or Comparative Example, except that a direction of the pressure-sensitive adhesive layer was changed along a surface of the pressure-sensitive adhesive layer whose peel strength was to be measured. That is, when the peel strength of a first surface was measured in the formation of the polarizing plate disclosed in Example 1, a second surface was attached to the side of the polarizer, and when the peel strength of the second surface was measured, the first surface was attached to the side of the polarizer. Afterward, a specimen was formed by cutting the polarizing plate in a size of 25 mm×100 mm (width×length). Subsequently, a released PET film attached onto the pressure-sensitive adhesive layer was peeled off, and the surface of the pressure-sensitive adhesive layer was attached to alkali-free glass using a 2-kg roller according to the specification of JIS Z 0237. Subsequently, the alkali-free glass to which the pressure-sensitive adhesive layer was attached was compressed in an autoclave (50° C., 0.5 atm) for approximately 20 minutes, and stored under constant temperature and humidity conditions (23° C., relative humidity: 50%) for 25 hours. Then, using a texture analyzer (TA) (Stable Micro System (United Kingdom)), the polarizing plate was peeled off from the alkali-free glass at a peel rate of 300 mm/min and a peel angle of 180 degrees to measure a peel strength. In addition, repeelability was evaluated under the following criteria:

<Criteria for Evaluation of Repeelability>
○: A day after attachment, the peel strength was 800 N/25 mm or less.
Δ: A day after attachment, the peel strength was 1,000 N/25 mm or more.
x: A day after attachment, the peel strength was 2,000 N/25 mm or more.

3. Evaluation of Durability and Reliability 2 specimens were prepared by cutting a specimen prepared by cutting a polarizing plate in a size of 90 mm×170 mm (width×length) per Example or Comparative Example. Subsequently, the two specimens were attached to both surfaces of a glass substrate (110 mm×190 mm×0.7 mm=width× length×thickness) such that optical absorption axes crossed, thereby preparing a sample. A pressure applied during attachment was approximately 5 kg/cm$^2$, and the attachment was carried out in a clean room to avoid air bubbles or extraneous materials at an interface.

The formed samples were left at room temperature for 24 hours, followed by the evaluation of the humidity and thermal resistance or thermal resistance. Evaluation conditions were as follows:

<Criteria for Evaluation of Durability and Reliability>
○: No air bubbles and/or peeling were generated.
Δ: Air bubbles and/or peeling were generated somewhat.
x: Air bubbles and/or peeling were generated considerably.

4. Evaluation of Water Resistance

Samples were prepared by attaching specimens formed by cutting the polarizing plates formed in Examples and Comparative Examples to a size of 90 mm×170 mm (width× length) to one surface of a glass substrate (110 mm×190 mm×0.7 mm=width×length×thickness). A pressure applied during attachment was approximately 5 kg/cm$^2$, and the attachment was executed in a clean room to prevent bubbles or impurities at an interface. Subsequently, the formed sample was put into water at 60° C., left for 24 hours, and it was observed whether bubbles or peeling were generated. The water resistance was evaluated according to the following criteria.

<Criteria for Evaluation of Water Resistance>
○: No air bubbles and/or peeling were generated.
Δ: Some bubbles and/or peeling were generated at an interface.
x: Bubbles and/or peeling were generated considerably.

5. Evaluation of Uniformity of Light Transmission

The polarizing plates formed in Examples and Comparative Examples were attached to a 22-inch LCD monitor (LG Philips LCD) in a state in which optical axes crossed, stored under constant temperature and humidity conditions (23° C., relative humidity: 50%) for 24 hours, and left at 80° C. for 200 hours. Subsequently, light was radiated to the monitor using a back light in a dark room, and the uniformity of light transmission was evaluated according to the following criteria:

<Criteria for Evaluation of Uniformity of Light Transmission>
◎: when non-uniformity of light transmission was not observed in four edge regions of a monitor by eyes
○: when non-uniformity of light transmission was observed slightly in four peripheral regions of a monitor by eyes
Δ: when non-uniformity of light transmission was observed somewhat in four peripheral regions of a monitor by eyes
x: when non-uniformity of light transmission was observed considerably in four peripheral regions of a monitor by eyes 6. Evaluation of Weight Average Molecular Weight and Distribution of Molecular Weight The weight average molecular weight and the distribution of the molecular weight of an acryl polymer were measured using GPC under the following conditions. To draw a calibration curve, standard polystyrene of an Agilent system was used, and measurement results were converted.

<Conditions for Measuring Weight Average Molecular Weight>

Measuring Apparatus: Agilent GPC (Agilent 1200 series, USA)
Column: two connected PL mixed B
Column Temperature: 40° C.
Eluent: Tetrahydrofuran
Flow Rate: 1.0 mL/min
Concentration: ~2 mg/mL (100 μL injection)

7. Evaluation of Curling Characteristic

Figure 4:
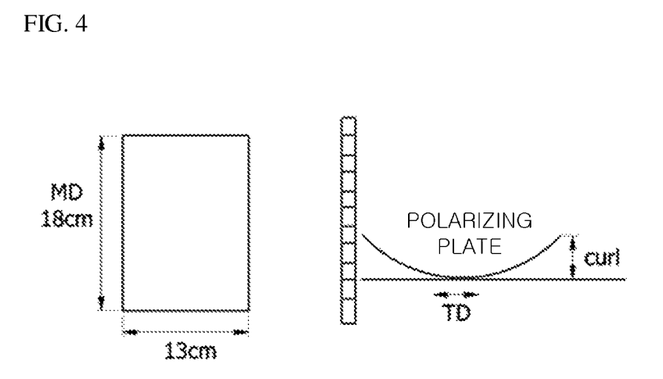
FIG. 4 is a schematic diagram illustrating a method of evaluating a curling characteristic.

A curling characteristic was evaluated according to the following criteria by laminating a protective film cut in a size of 130 mm×180 mm (width direction (transverse direction (TD))×length (MD direction)) with a polarizer using an adhesive composition during an operation of forming a polarizing plate and measuring curling occurring in the TD direction during radiation of UV rays or drying when a water-based polyvinylalcohol-based adhesive was used. The measurement of curling was executed by the method illustrated in FIG. 4.

<Evaluation Criteria> o: Curling occurring in the TD direction was less than 0.5 cm.

Δ: Curling occurring in the TD direction was 0.5 cm to 2.0 cm x: Curling occurring in the TD direction was more than 2.0 cm The measurement results are summarized and shown in Table 2.

TABLE 2

|  | Example | | | | Comparative Example | | | | |
| --- | --- | --- | --- | --- | --- | --- | --- | --- | --- |
|  | 1 | 2 | 3 | 4 | 1 | 2 | 3 | 4 | 5 |
| Tensile Modulus (25° C., MPa) | 90 | 200 | 160 | 70 | 300 | 0.09 | 150 | 0.06 | 90 |
| Peel Strength (First Surface) (gf/25 mm) | 30 | 15 | 20 | 35 | 15 | 350 | 20 | 500 | 30 |
| Peel Strength (Second Surface) (gf/25 mm) | 600 | 350 | 450 | 650 | 30 | 400 | 40 | 550 | 600 |
| Repeelability | o | o | o | o | o | Δ | o | Δ | o |
| Thermal Resistance | o | o | o | o | x | x | x | x | o |
| Humidity & Thermal Resistance | o | o | o | o | x | Δ | Δ | x | o |
| Water resistance | o | o | o | o | x | x | Δ | x | o |
| Uniformity of Light Transmission | o | o | o | o | Δ | o | o | o | o |
| Curling Characteristic | o | o | o | o | o | o | o | o | x |

What is claimed is:

1. A polarizing plate, comprising:
   a polarizer;
   an active energy beam-curable adhesive layer; and
   a pressure-sensitive adhesive layer having first and second surfaces, which are sequentially disposed,
   wherein a difference in peel strength between the first and second surfaces with respect to alkali-free glass satisfies the following General Equation 1:

$$X_2 - X_1 > 50 \text{ gf/25 mm} \qquad \text{[General Equation 1]}$$

where $X_1$ is peel strength of the first surface with respect to alkali-free glass, and $X_2$ is peel strength of the second surface with respect to alkali-free glass.

2. The polarizing plate according to claim 1, wherein the active energy beam-curable adhesive layer is directly attached to least one surface of the polarizer, and the first surface of the pressure-sensitive adhesive layer is directly attached to the adhesive layer.

3. The polarizing plate according to claim 1, wherein the pressure-sensitive adhesive layer is a single-layered pressure-sensitive adhesive layer.

4. The polarizing plate according to claim 1, wherein the polarizer is a polyvinylalcohol-based polarizer.

5. The polarizing plate according to claim 1, wherein the peel strength of the first surface with respect to alkali-free glass is 5 to 100 gf/25 mm.

6. The polarizing plate according to claim 1, wherein the peel strength of the second surface with respect to alkali-free glass is 100 to 1,000 gf/25 mm.

7. The polarizing plate according to claim 1, wherein the pressure-sensitive adhesive layer has a tensile modulus gradient according to a thickness direction in a direction from the first surface to the second surface.

8. The polarizing plate according to claim 7, wherein the pressure-sensitive adhesive layer has an average tensile modulus at 25° C. of 0.1 to 500 MPa.

9. The polarizing plate according to claim 1, wherein the pressure-sensitive adhesive layer includes a crosslinked structure containing an acryl polymer crosslinked by a multifunctional crosslinking agent and a crosslinked structure containing a photopolymerizable compound.

10. The polarizing plate according to claim 9, wherein the pressure-sensitive adhesive layer further includes a UV absorbent.

11. The polarizing plate according to claim 1, wherein the active energy beam-curable adhesive layer includes an adhesive composition including an epoxy compound and/or an acryl-based monomer in a cured state.

12. The polarizing plate according to claim 11, wherein the epoxy compound includes an alicyclic epoxy compound and/or a glycidyl ether-type epoxy compound.

13. The polarizing plate according to claim 11, wherein the epoxy compound has a weight average molecular weight of 1,000 to 5,000.

14. The polarizing plate according to claim 11, wherein the acryl-based monomer is a hydrophilic acryl-based monomer or a hydrophobic acryl-based monomer.

15. The polarizing plate according to claim 14, wherein the hydrophilic acryl-based monomer has a hydroxyl group, a carboxyl group or an alkoxy group.

16. The polarizing plate according to claim 11, wherein the adhesive composition further includes 1 to 40 parts by weight of a reactive oligomer.

17. The polarizing plate according to claim 11, wherein the adhesive composition is a non-solvent type composition.

18. The polarizing plate according to claim 11, wherein the adhesive composition has a viscosity at 25° C. of 5 to 1,000 cps.

19. The polarizing plate according to claim 1, further comprising:
   a protective film attached to a surface of the polarizer opposite to the surface to which the pressure-sensitive adhesive layer is attached.

20. The polarizing plate according to claim 19, wherein the protective film is a cellulose film, a polyester film, a polycarbonate film, a polyethersulfone film, an acryl film or a polyolefin film.

21. The polarizing plate according to claim 1, further comprising:
   at least one layer selected from the group consisting of an anti-reflection layer, an anti-glare layer, a phase retardation plate, a wide viewing angle compensation film and a brightness enhancement layer.

22. A liquid crystal display device, comprising:
   a liquid crystal panel; and
   the polarizing plate according to claim 1 attached to one or both surfaces of the liquid crystal panel.

23. The device according to claim 22, wherein the liquid crystal panel is attached to the second surface of the pressure-sensitive adhesive layer.

24. The device according to claim 22, wherein the liquid crystal panel is a passive matrix-type panel, an active matrix-type panel, an in-plane switching panel or a vertically-aligned panel.

* * * * *